(12) United States Patent  
Arling et al.

(10) Patent No.: US 9,264,755 B2
(45) Date of Patent: Feb. 16, 2016

(54) SYSTEM AND METHOD FOR PRESENTING PROGRAM GUIDE INFORMATION IN AN ELECTRONIC PORTABLE DEVICE

(75) Inventors: Paul D. Arling, Irvine, CA (US); Patrick H. Hayes, Mission Viejo, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 2449 days.

(21) Appl. No.: 11/312,303

(22) Filed: Dec. 20, 2005

(65) Prior Publication Data

US 2006/0101498 A1 May 11, 2006

Related U.S. Application Data

(63) Continuation-in-part of application No. 10/287,389, filed on Nov. 4, 2002, which is a continuation-in-part of application No. 09/905,396, filed on Jul. 13, 2001, now Pat. No. 6,938,101, application No. 11/312,303, which is a continuation-in-part of application No. 10/287,337, filed on Nov. 4, 2002, application No. 11/312,303, which is a continuation-in-part of application No. 09/905,396, which is a continuation-in-part of application No. 10/288,727, filed on Nov. 6, 2002.

(60) Provisional application No. 60/390,167, filed on Jun. 20, 2002, provisional application No. 60/374,556, filed on Apr. 22, 2002, provisional application No. 60/371,223, filed on Apr. 9, 2002, provisional application No. 60/344,020, filed on Dec. 20, 2001, provisional application No. 60/334,774, filed on Nov. 20, 2001, provisional application No. 60/390,286, filed on Jun. 20, 2002, provisional application No. 60/378,902, filed on May 8, 2002, provisional application No. 60/334,020, filed on Dec. 20, 2001.

(51) Int. Cl.
| | |
|---|---|
| *G06F 13/00* | (2006.01) |
| *G06F 3/00* | (2006.01) |
| *H04N 5/445* | (2011.01) |
| *H04N 21/431* | (2011.01) |
| *G06F 3/0488* | (2013.01) |
| *H04N 21/2665* | (2011.01) |
| *H04N 21/41* | (2011.01) |
| *H04N 21/45* | (2011.01) |
| *H04N 21/462* | (2011.01) |
| *H04N 21/482* | (2011.01) |
| *H04N 21/84* | (2011.01) |

(Continued)

(52) U.S. Cl.
CPC .......... *H04N 21/4312* (2013.01); *G06F 3/0488* (2013.01); *H04N 5/44543* (2013.01); *H04N 21/2665* (2013.01); *H04N 21/4126* (2013.01); *H04N 21/4314* (2013.01); *H04N 21/4532* (2013.01); *H04N 21/4622* (2013.01); *H04N 21/482* (2013.01); *H04N 21/84* (2013.01); *H04N 5/45* (2013.01); *H04N 5/50* (2013.01); *H04N 2005/4408* (2013.01); *H04N 2005/4414* (2013.01); *H04N 2005/4419* (2013.01); *H04N 2005/4441* (2013.01)

(58) Field of Classification Search
USPC ...................................................... 725/37–61
See application file for complete search history.

(56) References Cited

U.S. PATENT DOCUMENTS

| 4,894,789 A | 1/1990 | Yee |
|---|---|---|
| 5,005,084 A | 4/1991 | Skinner |

(Continued)

FOREIGN PATENT DOCUMENTS

| EP | 0561435 A2 | 9/1993 |
|---|---|---|
| EP | 0967797 A2 | 12/1999 |

(Continued)

*Primary Examiner* — Hunter B Lonsberry

(74) *Attorney, Agent, or Firm* — Greenberg Traurig, LLP

(57) ABSTRACT

A system and method for display of supplemental data in association with one or more buttons of controlling device. Operation of a button associated with supplemental data displayed on a controlling device causes an appliance under control of the controlling device to enable rendering of content. The supplemental data is time-variable in that it is associated with the media content available contemporaneously with display of the supplemental data on the controlling device.

19 Claims, 10 Drawing Sheets

(51) Int. Cl.
*H04N 5/45* (2011.01)
*H04N 5/50* (2006.01)
*H04N 5/44* (2011.01)

(56) References Cited

U.S. PATENT DOCUMENTS

| | | |
|---|---|---|
| 5,260,778 A | 11/1993 | Kauffman et al. |
| 5,293,357 A | 3/1994 | Hallenbeck |
| 5,307,055 A | 4/1994 | Baskin et al. |
| 5,410,326 A * | 4/1995 | Goldstein ............... 348/734 |
| 5,450,079 A | 9/1995 | Dunaway |
| 5,565,888 A | 10/1996 | Selker |
| 5,574,964 A | 11/1996 | Hamlin |
| 5,635,989 A | 6/1997 | Rothmuller |
| 5,648,760 A | 7/1997 | Kumar |
| 5,652,613 A | 7/1997 | Lazarus et al. |
| 5,671,267 A | 9/1997 | August et al. |
| 5,710,605 A | 1/1998 | Nelson |
| 5,724,106 A | 3/1998 | Autry et al. |
| 5,751,372 A | 5/1998 | Forson |
| 5,761,606 A | 6/1998 | Wolzien |
| 5,793,438 A | 8/1998 | Bedard |
| 5,801,787 A | 9/1998 | Schein et al. |
| 5,828,419 A | 10/1998 | Bruette et al. |
| 5,835,864 A | 11/1998 | Diehl et al. |
| 5,838,775 A | 11/1998 | Montalbano |
| 5,855,006 A | 12/1998 | Huemoeller et al. |
| 5,900,875 A | 5/1999 | Haitani et al. |
| 5,901,366 A | 5/1999 | Nakano et al. |
| 5,915,026 A | 6/1999 | Mankovitz |
| 5,936,611 A | 8/1999 | Yoshida |
| 5,940,073 A | 8/1999 | Klosterman et al. |
| 5,945,988 A | 8/1999 | Williams et al. |
| 5,956,025 A | 9/1999 | Goulden et al. |
| 5,970,206 A | 10/1999 | Yuen et al. |
| 5,974,222 A | 10/1999 | Yuen et al. |
| 5,978,043 A * | 11/1999 | Blonstein et al. ........... 348/569 |
| 6,002,394 A | 12/1999 | Schein et al. |
| 6,002,450 A | 12/1999 | Darbee et al. |
| 6,012,071 A | 1/2000 | Krishna et al. |
| 6,018,372 A | 1/2000 | Etheredge |
| 6,020,881 A | 2/2000 | Naughton et al. |
| 6,028,599 A | 2/2000 | Yuen et al. |
| 6,040,829 A | 3/2000 | Croy et al. |
| 6,067,552 A | 5/2000 | Yu |
| 6,097,441 A | 8/2000 | Allport |
| 6,104,334 A | 8/2000 | Allport |
| 6,127,941 A | 10/2000 | Van Ryzin |
| 6,130,726 A * | 10/2000 | Darbee et al. ............... 348/734 |
| 6,133,909 A | 10/2000 | Schein et al. |
| 6,137,549 A | 10/2000 | Rasson et al. |
| 6,151,059 A | 11/2000 | Schein et al. |
| 6,172,674 B1 | 1/2001 | Etheredge |
| 6,177,931 B1 | 1/2001 | Alexander et al. |
| 6,195,589 B1 | 2/2001 | Ketcham |
| 6,211,856 B1 | 4/2001 | Choi et al. |
| 6,211,870 B1 | 4/2001 | Foster |
| 6,219,694 B1 | 4/2001 | Lazaridis et al. |
| 6,256,019 B1 | 7/2001 | Allport |
| 6,278,499 B1 | 8/2001 | Darbee et al. |
| 6,285,357 B1 | 9/2001 | Kushiro et al. |
| 6,311,329 B1 | 10/2001 | Terakado et al. |
| 6,341,374 B2 | 1/2002 | Schein et al. |
| 6,369,840 B1 | 4/2002 | Barnett et al. |
| 6,408,435 B1 | 6/2002 | Sato |
| 6,437,836 B1 * | 8/2002 | Huang et al. ............... 348/734 |
| 6,463,463 B1 | 10/2002 | Godfrey et al. |
| 6,532,589 B1 | 3/2003 | Proehl et al. |
| 6,563,430 B1 | 5/2003 | Kemink et al. |
| 6,577,350 B1 | 6/2003 | Proehl et al. |
| 6,597,374 B1 | 7/2003 | Baker et al. |
| 6,670,971 B1 | 12/2003 | Oral |
| 6,690,392 B1 | 2/2004 | Wugoski |
| 6,822,661 B2 | 11/2004 | Sai et al. |
| 6,862,741 B1 * | 3/2005 | Grooters ............... 725/39 |
| 6,898,762 B2 * | 5/2005 | Ellis et al. ............... 715/716 |
| 7,088,952 B1 * | 8/2006 | Saito et al. ............... 455/3.06 |
| 7,283,059 B2 * | 10/2007 | Harris et al. ............ 340/825.69 |
| 2001/0054180 A1 | 12/2001 | Atkinson |
| 2002/0001042 A1 * | 1/2002 | Terakado et al. ............. 348/460 |
| 2002/0042915 A1 * | 4/2002 | Kubischta et al. ............. 725/38 |
| 2002/0044225 A1 * | 4/2002 | Rakib ............... 348/734 |
| 2002/0056112 A1 | 5/2002 | Dureau et al. |
| 2002/0057678 A1 | 5/2002 | Jiang et al. |
| 2002/0059596 A1 * | 5/2002 | Sano et al. ............... 725/39 |
| 2002/0059610 A1 * | 5/2002 | Ellis ............... 725/58 |
| 2002/0194081 A1 | 12/2002 | Perkowski |
| 2002/0199192 A1 * | 12/2002 | Donnelly ............... 725/40 |
| 2003/0056215 A1 * | 3/2003 | Kanungo ............... 725/38 |
| 2003/0058269 A1 | 3/2003 | Dunstan |
| 2003/0093813 A1 * | 5/2003 | Shintani et al. ............... 725/133 |
| 2004/0168187 A1 * | 8/2004 | Chang ............... 725/40 |

FOREIGN PATENT DOCUMENTS

| | | |
|---|---|---|
| EP | 0987888 A1 | 3/2000 |
| EP | 1204275 A2 | 5/2002 |
| GB | 2343073 A | 4/2000 |
| WO | WO 00/40016 | 7/2000 |
| WO | WO 00/58935 | 10/2000 |
| WO | WO 01/20572 A1 | 3/2001 |

* cited by examiner

SYSTEM AND METHOD FOR PRESENTING PROGRAM GUIDE INFORMATION IN AN ELECTRONIC PORTABLE DEVICE

RELATED APPLICATION INFORMATION

This application claims the benefit of and is a continuation-in-part of U.S. application Ser. No. 10/287,389 filed on Nov. 4, 2002 which, in turn, is a continuation-in-part of U.S. application Ser. No. 09/905,396 filed on Jul. 13, 2001 now U.S. Pat. No. 6,938,101 and which claims the benefit of U.S. Application No. 60/390,167 filed on Jun. 20, 2002, No. 60/374,556 filed on Apr. 22, 2002, No. 60/371,223 filed on Apr. 9, 2002, No. 60/344,020 filed on Dec. 20, 2001, and No. 60/334,774 filed on Nov. 20, 2001.

This application also claims the benefit of and is a continuation-in-part of U.S. application Ser. No. 10/287,337 filed on Nov. 4, 2002 which, in turn, is a continuation-in-part of U.S. application Ser. No. 09/905,396 filed on Jul. 13, 2001 now U.S. Pat. No. 6,938,101 and which claims the benefit of U.S. Application No. 60/390,286 filed on Jun. 20, 2002, No. 60/378,902 filed on May 8, 2002, and No. 60/334,020 filed on Dec. 20, 2001.

This application additionally claims the benefit of and is a continuation-in-part of U.S. application Ser. No. 10/288,727 filed on Nov. 6, 2002 which claims the benefit of U.S. Application No. 60/344,020 filed on Dec. 20, 2001 and No. 60/334,774 filed on Nov. 20, 2001.

All of these applications are hereby incorporated by reference in their entirety.

BACKGROUND OF THE INVENTION

This invention generally relates to a system and method for presenting program guide information in the display of an electronic portable device having communication capabilities such as a personal digital assistant ("PDA"), Web Tablet, touch screen remote control, lap-top computer, mobile gaming device, and the like.

SUMMARY OF THE INVENTION

In accordance with the description that follows, a system and method is provided for presenting information, such as program guide information, in a portable electronic device. More specifically, information pertaining to one or more currently available programs is presented to a user in association with one or more corresponding favorite channel keys which favorite channel keys may be actuated to provide for rapid and convenient selection of programming content to be enjoyed on an appliance.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
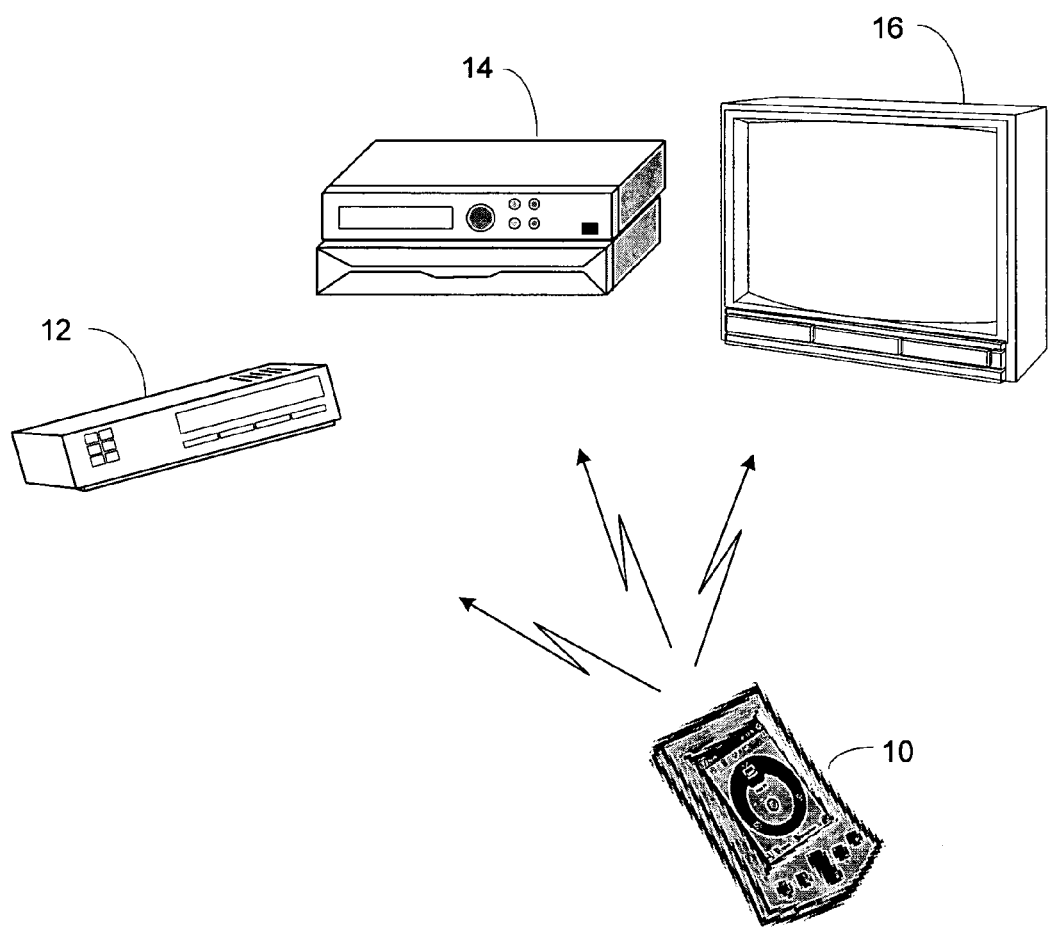
FIG. 1 illustrates an exemplary portable device having a remote control application for use in controlling the operation of home appliances.

In an exemplary embodiment, a universal remote control function is provided as an application which may run on a portable electronic device 10. By way of example, representative platforms for the device 10 include, but are not limited to, devices such as remote controls (e.g., remote control 90), lap-top computers, Web Tablets, mobile gaming devices, mobile phones, and/or PDAs manufactured by HP/Compaq (such as the iPAQ brand PDA), Palm, Visor, Sony, etc. Thus, a preferred underlying platform includes a processor coupled to a memory system comprising one or more of a ROM memory, non-volatile read/write memory, and/or RAM memory (a memory system); a key matrix in the form of physical buttons; an internal clock and timer; a transmission circuit; a power supply; a touch screen display to provide visible feedback to and accept input from a consumer; and I/O circuitry for allowing the device to exchange communications with an external computer such as server and/or client. Additional input circuitry, such as a barcode reader, may also be utilized.

To control the operation of the device 10, the memory system includes executable instructions that are intended to be executed by the processor. In this manner, the processor may be programmed to control the various electronic components within the device 10, e.g., to monitor power, to cause the transmission of signals, etc. Within the memory system, the ROM portion of memory is preferably used to store fixed programming and data that remains unchanged for the life of the product. The non-volatile read/write memory, which may be FLASH, EEPROM, battery-backed up RAM, "Smart Card," memory stick, or the like, is preferably provided to store consumer entered setup data and parameters, downloaded data, etc., as necessary. RAM memory may be used by the processor for working storage as well as to hold data items which, by virtue of being backed up or duplicated on an external computer (for example, a client device) are not required to survive loss of battery power. While the described memory system preferably comprises all three classes of memory, it will be appreciated that, in general, the memory system can be comprised of any type of computer-readable media, such as ROM, RAM, SRAM, FLASH, EEPROM, or the like in various combinations. Preferably, however, at least part of the memory system should be non-volatile or battery backed such that basic setup parameters and operating features will survive loss of battery power. In addition, such memories may take the form of a chip, a hard disk, a magnetic disk, and/or an optical disk without limitation.

For commanding the operation of appliances of different makes, models, and types, the memory system may also include a command code library. The command code library is comprised of a plurality of command codes that may be transmitted from the device 10 under the direction of the remote control application for the purpose of controlling the operation of an appliance. The memory system may also includes instructions which the processor uses in connection with the transmission circuit to cause the command codes to be transmitted in a format recognized by an identified appliance. While the transmission circuit preferably utilizes infrared transmissions, it will be appreciated that other forms of wired or wireless transmissions, such as radio frequency, may also be used.

To identify appliances by type and make (and sometimes model) such that the remote control application of the device 10 is adapted to cause the transmission of command codes in the format appropriate for such identified appliances, information may be entered into the device 10. Since methods for setting up a remote control application to cause the transmissions of commands to control the operation of specific appliances are well-known, they will not be described in greater detail herein. Nevertheless, for additional details pertaining to remote control application setup, the reader may turn to U.S. Pat. Nos. 6,225,938, 4,623,887, 5,872,562, 5,614,906, 4,959,810, 4,774,511, and 4,703,359 which are incorporated herein by reference in their entirety. It should also be appreciated that these set-up methods may be used to configure a personal computer to communicate with a home appliance, for example, if the personal computer is anticipated to use wireless communications to command the operation of appliances in a home entertainment network such as described below.

To cause the device 10 to perform an action, the device 10 is adapted to be responsive to events such as, by way of example only, a sensed consumer interaction with one or more keys on the key matrix, a sensed consumer interaction with the touch screen display, or a sensed signal from an external source such as a remote computer. In response to an event, appropriate instructions within the memory system are executed. For example, when a hard or soft command key associated with the remote control application is activated on the device 10, the device 10 may read the command code corresponding to the activated command key from the memory system and transmit the command code to an appliance in a format recognizable by the appliance. It will be appreciated that the instructions within the memory system can be used not only to cause the transmission of command codes to appliances but also to perform local operations. While not limiting, local operations that may be performed by the device that are related to the remote-control application include favorite channel setup, macro button setup, command function key relocation, etc. Examples of such local operations can be found in U.S. Pat. Nos. 5,481,256, 5,959,751, 6,014,092, which are incorporated herein by reference in their entirety.

As discussed, the platform of the device 10 preferably comprises a general purpose, processor system which is controllable by software. The software may include routines, programs, objects, components, and/or data structures that perform particular tasks that can be viewed as an operating system together with one or more applications. The operating system, for example a "Windows CE," Linux, or Symbian operating system or the like, provides an underlying set of management and control functions which are utilized by applications to offer the consumer functions such as calendar, address book, spreadsheet, notepad, Internet browsing, etc., as well as control of appliances. Thus, it is to be understood that applications in addition to or complimentary with the remote control application can also be supported by the device 10 and, as such, in terms of the internal software architecture, the "remote control" application may be but one of several possible applications which may co-exist within the device 10.

In terms of providing operating system functionality, it should also be understood that the demarcation between the portable device 10 and a host/client computer, described in greater detail hereinafter, may vary considerably from product to product. For example, at one extreme the portable device 10 may be nothing more than a slave display and input device in wireless communication with a computer that performs all computational functions. At the other extreme, the portable device 10 may be a fully-functional computer system in its own right complete with local mass storage. Alternatively, the functionality of device 10 may be restricted to that of a control device for appliances and/or media streams, etc. only—i.e. it is also to be appreciated that a hardware platform similar to that described above may be used in conjunction with a scaled-down operating system to provide remote control functionality only, i.e., as a standalone application. In all cases, however, the principles expressed herein remain the same.

To provide a means by which an consumer can interact with the device 10, the device 10 is preferably provided with software that implements a graphical user interface. The graphical user interface software may also provide access to additional software, such as a browser application, that is used to display information that may be received from an external computer. Such a graphical user interface system is described in pending U.S. Application Nos. 60/264,767, 60/334,774, and 60/344,020 all of which are incorporated herein by reference in their entirety.

Figure 2:
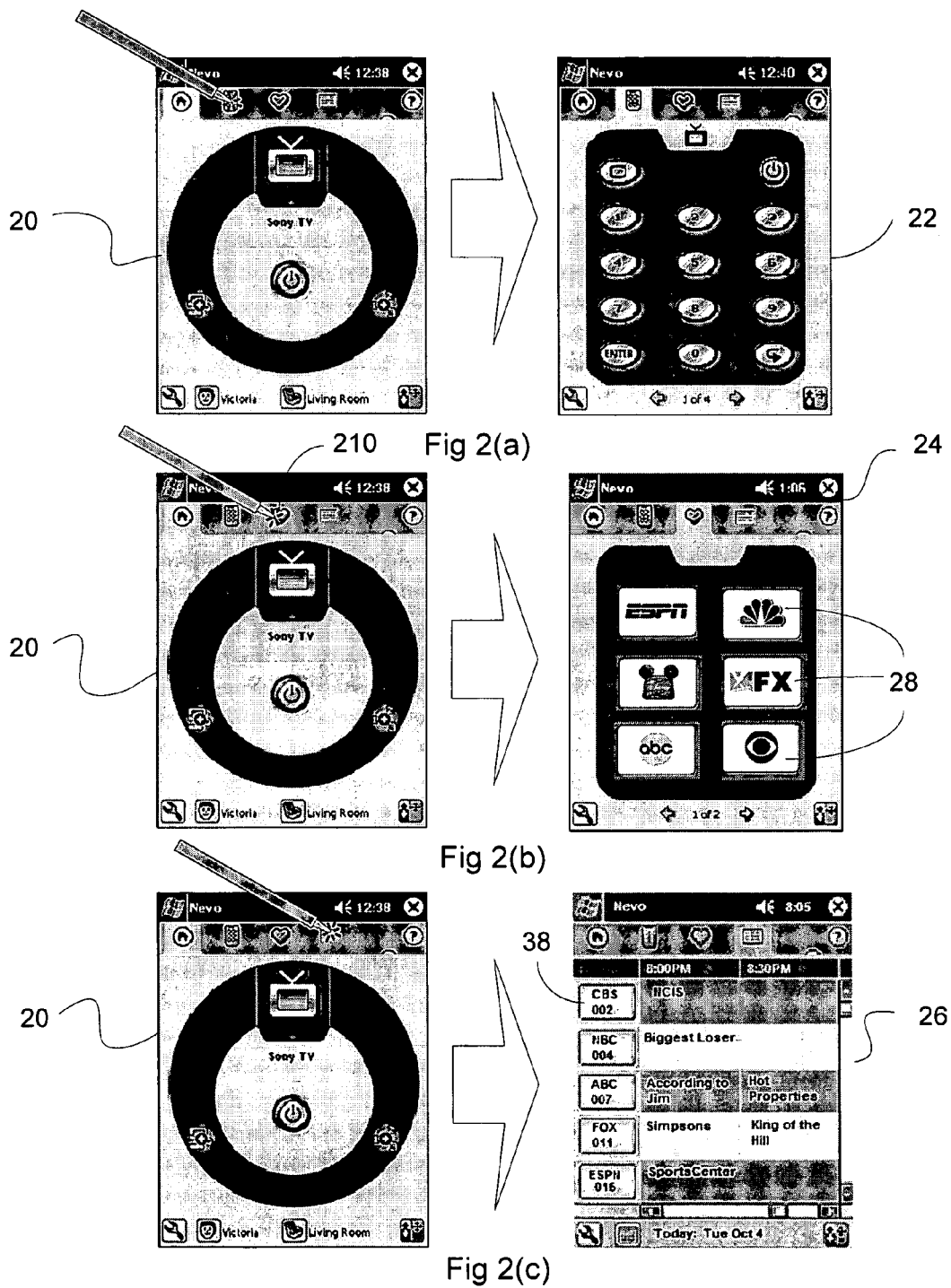
FIG. 2 illustrates exemplary screen shots of a graphical user interface of the portable device of FIG. 1.

For controlling the operation of one or more consumer appliances 12, 14, and/or 16 as illustrated in FIG. 1, the portable controlling device 10 includes a universal remote control application with a graphical user interface. Features offered by the remote control application may include a "home page" 20 from which the user may select various functionalities such as, for example, a device control panel 22, a "Favorites" page 24 (which allows direct tuning of an appliance by means of a command transmission to a favorite program channel as indicated to a user by the logo/name associated with the program channel), a program guide display 26, etc. all as illustrated in FIG. 2.

Figures 6, 7:
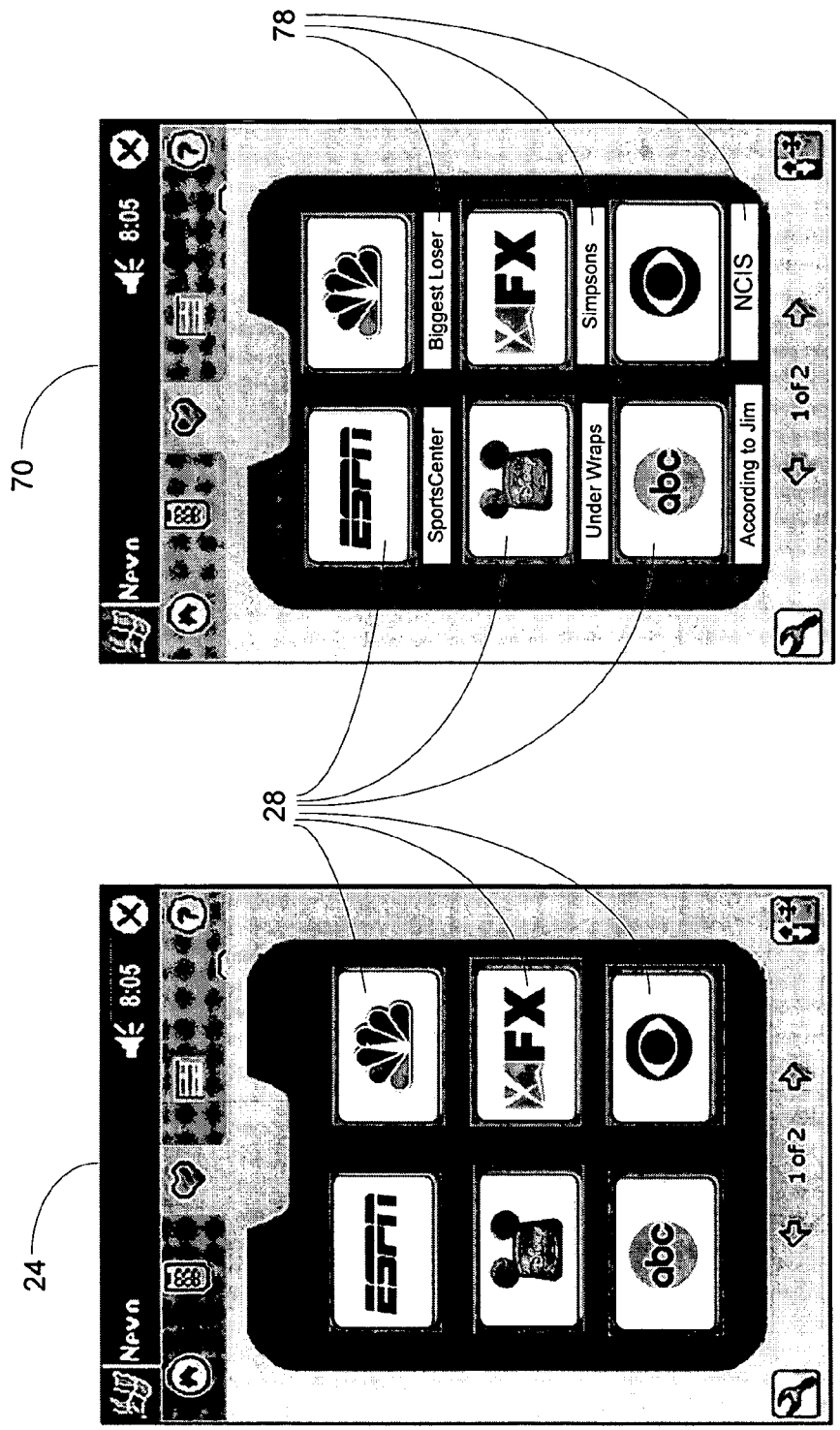
FIGS. 6 and 7 illustrate an exemplary favorite channel page without and with the display of program guide information.

In particular, the remote control application may provide one or more favorites pages 24 containing button icons 28 which the user may configure for direct access to his favorite programming (for example, to cause the transmissions of commands to cause a device to tune to a favorite channel or to begin rendering a particular media stream), switch to or enable a favorite device, etc. Access to such favorites pages may be made, for example, via activation of an icon 210 on the home screen page 20 illustrated in FIG. 2. An exemplary favorites page is illustrated in FIGS. 2(b) and 6. A favorites page may be populated with a selection 28 of commonly requested content providers (e.g., using their logos) as shown in FIG. 2(b). Initialization of the favorites page preferably occurs during initial set-up of the remote control application as described in detail in co-pending U.S. patent application Ser. No. 10/288,727 entitled "User Interface for a Hand Held Remote Control Device," of like assignee. It will also be appreciated that favorites pages may subsequently be edited or additional favorites pages may be created such as, for example, when users and/or rooms and/or equipment are added to the control device 10.

Figure 5:
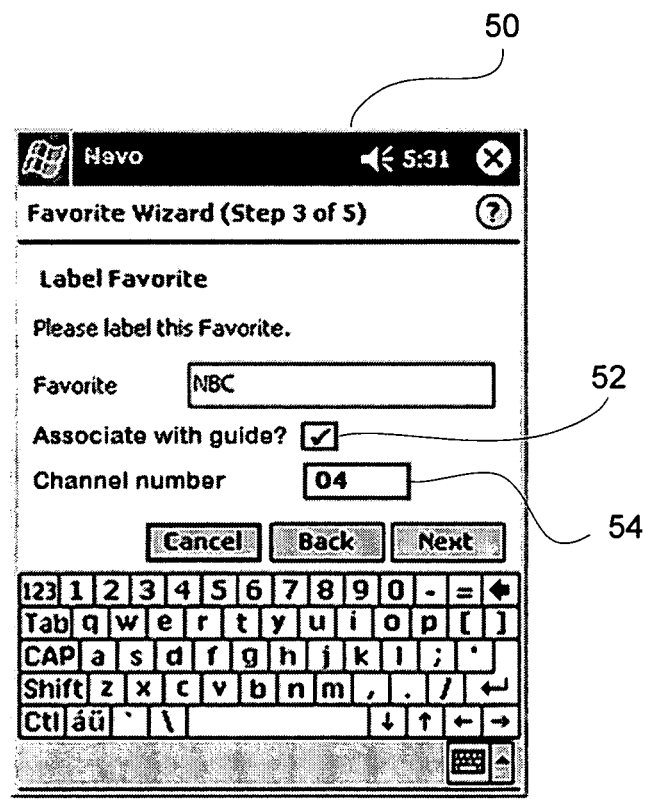
FIG. 5 illustrates an exemplary screen shot of a setup wizard of the portable device of FIG. 1 specifically illustrating the step of associating a favorite channel key with downloadable program guide information.

As described in the above referenced U.S. patent application Ser. No. 10/288,727, a favorites setup wizard may be provided as part of the remote control application programming to guide a user through the steps necessary to configure each favorite button 28. This wizard may first guide the user through the recording of a sequence of keystrokes or other actions/events which are to be associated with the favorites entry being configured. Once the commands and/or actions desired to be associated with the button have been defined, the user may then be requested to assign a label (name) and image (icon) to the favorites entry. In the present exemplary embodiment, the step of labeling the favorite may also include an option for the user to associate the button with the program guide information for a particular channel. As illustrated in FIG. 5, the user may select this option 52 and enter a channel number 54 corresponding to one of the program guide data fields. (For the sake of brevity, the graphical user interface panels corresponding to the other steps of this setup wizard are not illustrated herein, however the interested reader may find these fully illustrated and described in detail in the before referenced U.S. patent application Ser. No. 10/288,727.)

An exemplary result of using the setup wizard is illustrated in FIGS. 6 and 7. FIG. 6 illustrates an exemplary favorites page display 24 with favorite buttons 28 according to the prior referenced U.S. patent application Ser. No. 10/288,727 (or according to the current embodiment in the case where program guide associations 52 were declined by the user). FIG. 7 illustrates a similar favorites page 70 with program guide associations enabled such that the favorites display of FIG. 7 includes supplemental text panels 78 below each button 28 to provide information regarding the current programming content available on each of the designated channels. The program guide data from which these informational displays 78 are derived is the same program guide data that is used to generate the full page guide display grid 26 illustrated in FIG. 2 or 3. It will be appreciated that while text data is most readily adapted for display in supplemental text panels 78, any type of data (e.g., alphanumeric, graphical, iconic, colors, etc.) may be displayed and that the information may be displayed in any fashion (e.g., horizontal scrolling, blinking, vertical rolling, etc.) in order to convey desired information to a user. As such the term "text panel" should be read broadly as generally indicative of data fields capable of displaying any type of information, collectively referred to as "supplemental data," in any manner as described herein.

Figure 8:
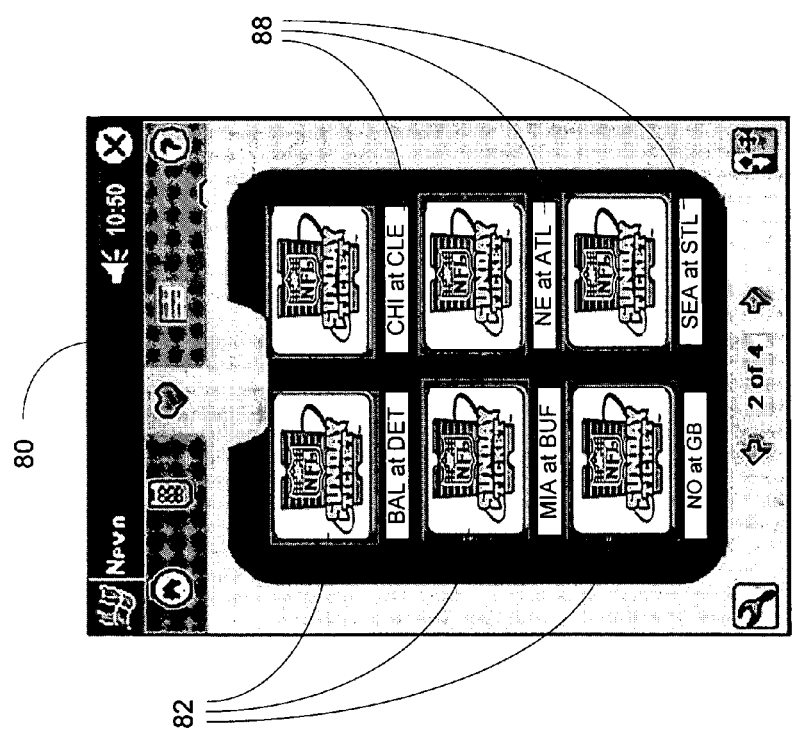
FIG. 8 illustrates a further exemplary favorite channel page which includes display of program guide information.

By way of further example, FIG. 8 illustrates an additional favorites display page 80. In this example, favorites buttons 82 have been configured to access multiple concurrently active sporting events such as, for example, those available to a subscriber to DirecTV's "NFL Sunday Ticket" service. In this example, supplemental text panels 88 display the team match-up on each channel, once again derived from downloaded program guide data 48'.

While not intended to be limiting, the program guide may be represented as a grid having a plurality of cells containing program information, where the cells are arranged in rows corresponding to content providers and columns corresponding to times of day, such as described, for example, in co-pending U.S. patent application Ser. No. 10/287,389 entitled "System and Method for Interacting with a Program Guide Displayed on a Portable Electronic Device," of like assignee. As illustrated in FIGS. 2 (*c*) and 3, program guide display 26 row indicators may be formatted using channel names and/or numbers 38, or channel logos to identify soft keys or hard keys (collectively referred to as "buttons") which the consumer may activate in order to have the device 10 transmit the appropriate remote control command(s) to cause an appliance to tune to a channel corresponding to the labeled button. If used, the channel logo graphics may be included as part of downloaded program guide data, as will be described hereinafter, or the graphics may be linked to and derived from the icon data 412 (FIG. 4) used to create the favorite channel display page(s) 24. It will also be appreciated that the program guide display 26 may be arranged in numerical or alphabetical sequence by channel, by favorite channel (in the same sequence as they appear in a favorite channels page 24), by program type or genre, etc.

Figure 3:
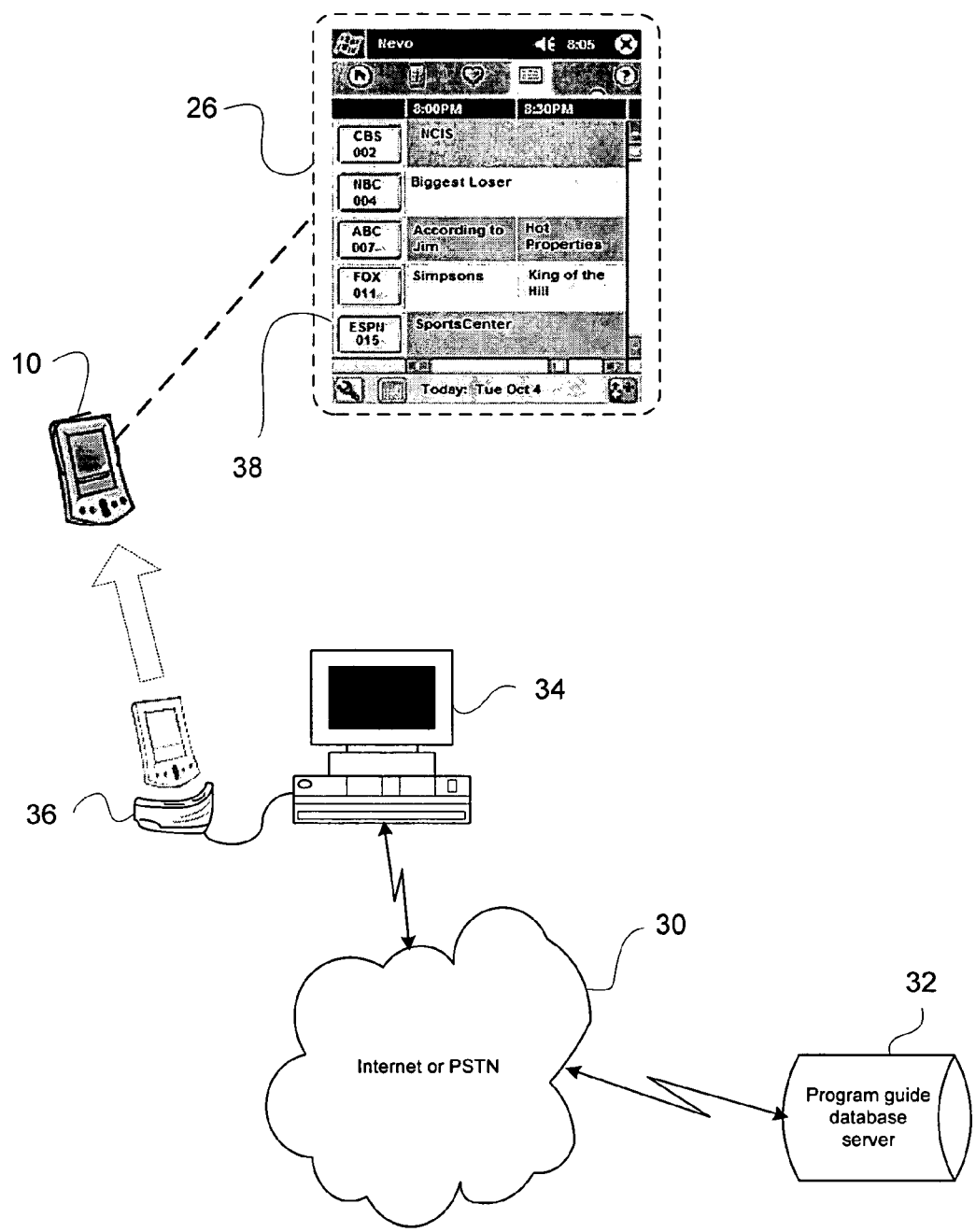
FIG. 3 illustrates an exemplary network by which program guide information is downloadable to the portable device of FIG. 1.

Data for the program guide display 26 may be obtained over the Internet 30 from a program guide database server 32 using a personal computer 34 and docking station 36 as illustrated in FIG. 3. In such a system, the device 10 is periodically docked with the docking station 36 for file synchronization purposes. Since software for providing such synchronization functionality, e.g., Microsoft's ActiveSync brand synchronization software, is well known and widely used in PDA applications, this functionality will not be discussed in further detail herein.

Figure 4:
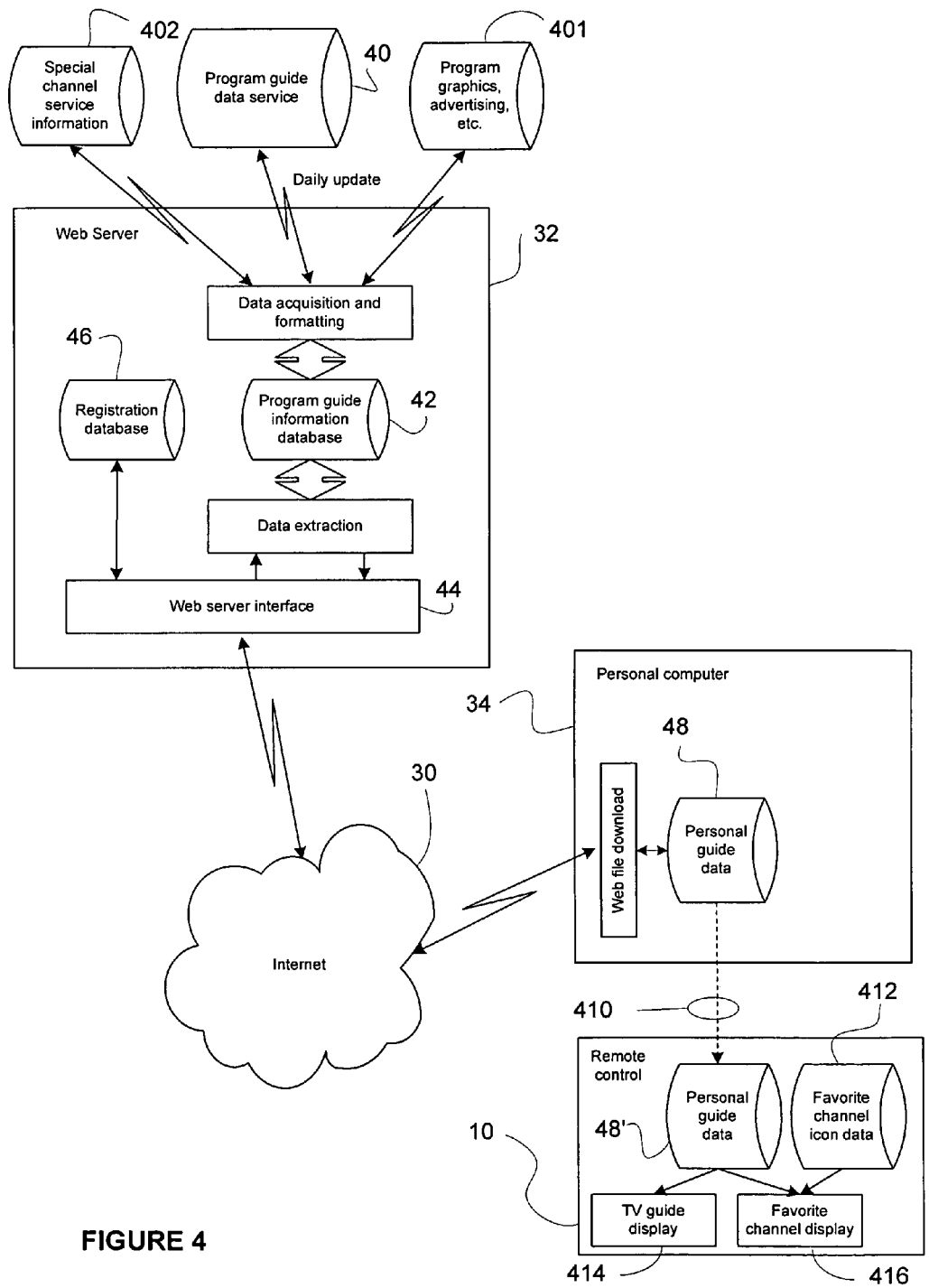
FIG. 4 illustrates a more detailed view of the network illustrated in FIG. 3.

To acquire guide data for use in connection with the remote control application, an exemplary guide data acquisition process is illustrated in FIG. 4. As illustrated, raw program guide data 40 is generally available by subscription from entities such as, for example, Tribune Media Services ("TMS"). A program guide data server 32 having a web server interface 44 is normally configured to access the TMS data on a periodic basis, typically once every 24 hours, after TMS's nightly update is complete. The raw guide data obtained from TMS may then be formatted and stored into a local database 42 associated with the Web server 32. Additional data, such as graphics 401, which may be associated with program descriptions, special service information, and/or advertising 402 (e.g., pay-per view), etc. may also be obtained from third-party sources and combined into the database 42 for later delivery to system users. It should also be appreciated that, while the illustrated examples are in the context of a TV program database sourced from TMS, in practice the programming information stored in the server database 42 may be obtained from several different sources and may span more than one type of programming, for example, radio broadcast information, Webcasts, etc. in addition to or as a substitute for TV schedule information.

To obtain program guide information for use with program guide display application 414, a consumer may log onto the Web server 32 using a personal computer 34 and any standard Web browser such as, for example, Microsoft's Internet Explorer brand Web browser. The Web server 32 identifies the consumer and their preferences via a combination of log-in data stored in a registration database 46 and/or a "cookie" stored on the consumer's local hard drive, as is known in the art. A detailed exemplary description of how a user may register at and establish preferences with such a server may be found in co-pending U.S. patent application Ser. No. 10/287,411 "System And Method For Controlling The Recording Functionality Of An Appliance Using A Program Guide" or Ser. No. 10/287,337 "System and Method for Updating Information in a Portable Electronic Device", both of like assignee, and for the sake of brevity will accordingly not be repeated herein. It will be appreciated that once the initial registration and preference setting is complete, the process of downloading program guide data may be automated. For example, the consumer's computer 34 may be configured to automatically dial out via a PSTN or Internet at a fixed time every night, at some predetermined time interval, etc. to contact the Web server 32 and retrieve the guide data.

Based on the identity and preferences of a consumer, a Web server interface 44 and related data extraction programs, illustrated in FIG. 4, extract an appropriate subset of the program guide data stored in the database 42 and format this extracted data into a personal guide data file 48 for transfer to the consumer's computer 34 via the Internet 30. The transferred guide data file may include program listing information originating from the program guide data provider 40; supplemental graphics and/or advertising 401 either associated with particular programs or free standing (originating from program graphics provider(s)); special channel service information 402 (originating from the service provider of other entities); etc. all of which may be individually tailored to the consumer based on their specified preferences, service type, and/or geographic location. Once located on the consumer's computer 34, the file 48 can be automatically transferred to the device 10 via the synchronization process 410 the next time the device 10 is docked with the computer 34, i.e., the device 10 will now have data file 48' stored in its memory.

The various user interactions with program guide display 26 and guide application 414, for example obtaining additional information regarding a current or upcoming program, selecting the channel currently being viewed, tagging future programs for recording, etc. are described in greater detail in the before referenced co-pending application U.S. patent application Ser. No. 10/287,389 and will not be further described herein.

In the exemplary embodiment, guide data 48' locally stored in portable device 10 is also used by favorite channel display application 416, in conjunction with favorite channel icon data 412, to generate favorite channel display pages, for example of the type illustrated in FIG. 7 or 8. To this end, it will be appreciated that the programming may access one or more designated data fields in the program guide file 48' (e.g., the title of the program data field) that are associated with a favorite channel and a desired time (e.g., the time at which the user first instantiates the favorite channel page or a time designated by the user (which allows for the viewing of future information), etc. which displayed information may be updated automatically by the programming accessing the data file 48' at, for example, predetermined time intervals such as every 5 minutes, every ½ hour, etc. especially when used to display information to the user according to the current time) to derive the information to be displayed in the fields 78.

In some instances, the consumer's computer 34 may also be connected to a home network which may be wired or wireless. In such a case, also attached to the home network may be a network-enabled appliance which is already equipped to obtain and store program guide information, for example, a digital cable set top box, a digital video recorder ("DVR"), etc. It will be appreciated that in these instances program guide data for utilization in the portable device may be obtained locally rather than via the Internet, either using computer 34 as an intermediary, or directly by the portable device itself via a wireless link such as IEEE 802.11, Bluetooth, Zigbee, etc. or even direct docking with the appliance upon which the guide data is maintained.

Figure 9:
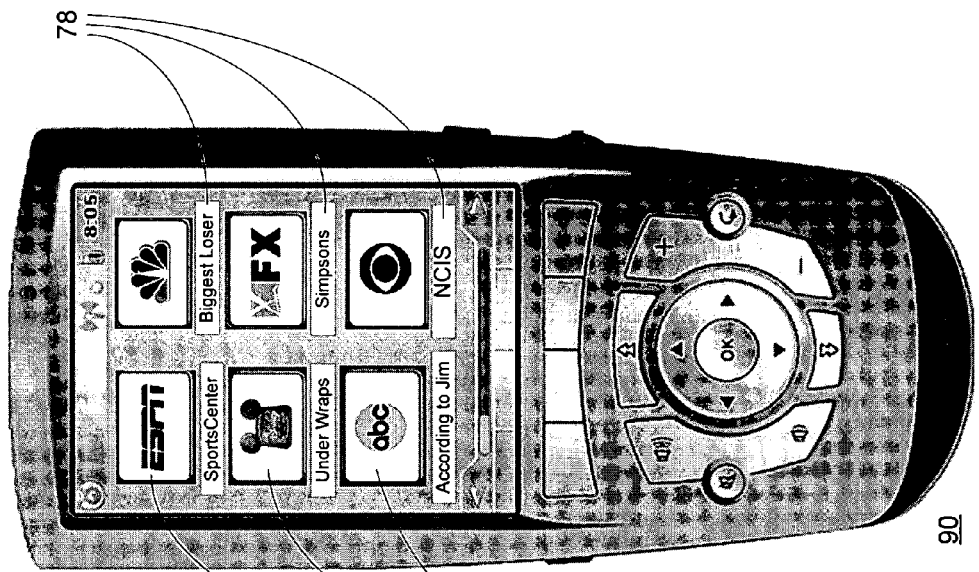
FIG. 9 illustrates a second exemplary portable device having a remote control application for use in controlling the operation of home appliances.
Figure 10A:
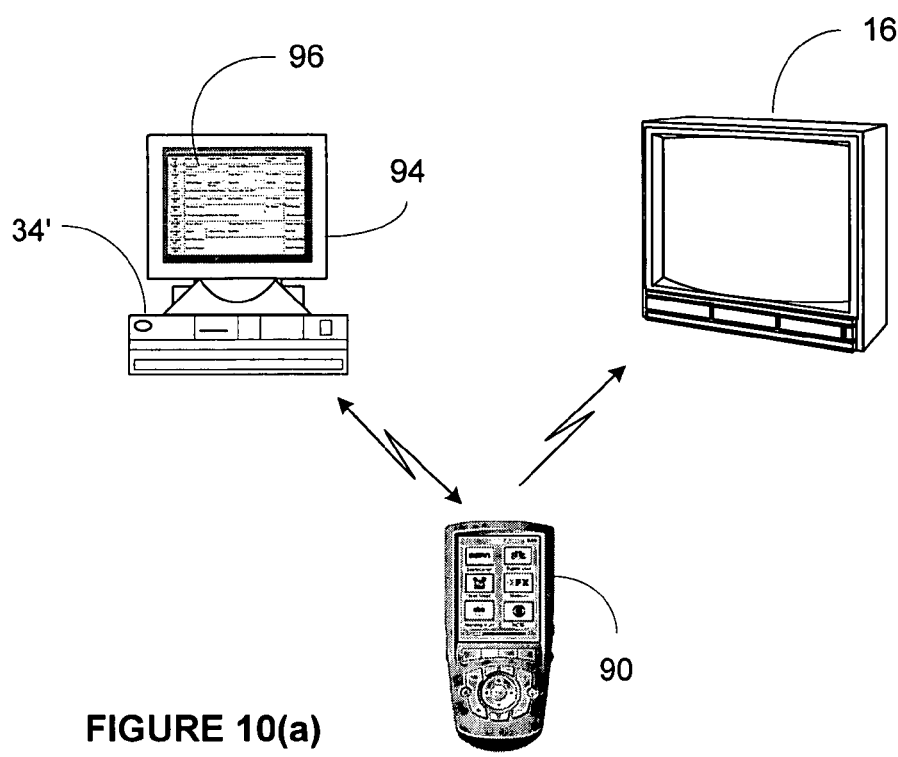
FIG. 10 illustrates systems in which the exemplary portable device of FIG. 9 may be used.
Figure 10B:
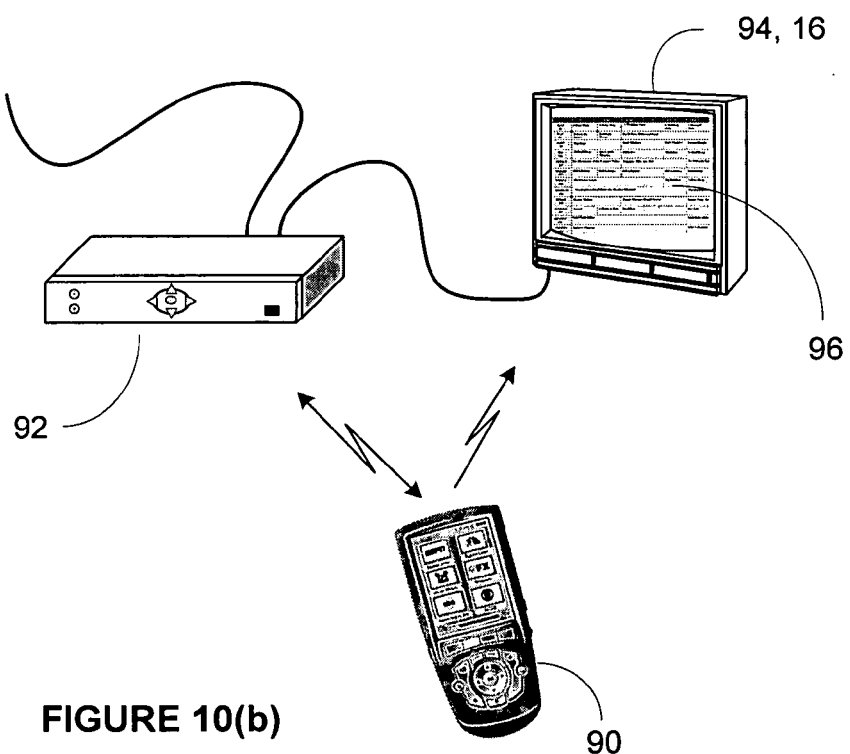

By way of further example, FIGS. 9 and 10 illustrate an exemplary system in which a portable device 10 in the form of a remote control device 90 is adapted to acquire guide data from a personal computer 34' as shown in FIG. 10(*a*), or set top box 92 as shown in FIG. 10(*b*), which acquires and stores program guide data in order to support an interactive program guide display 96 on a connected video rendering device 94 (e.g., television set 16, PC monitor, home theater projector, portable display device, etc.). Although illustrated herein in terms of an exemplary PC or set top box, it should be appreciated that in general the program guide data acquisition and storage device may be a digital cable box, satellite receiver, DVR, personal computer, home media center, internet gateway, etc., without limitation.

Figure 11:
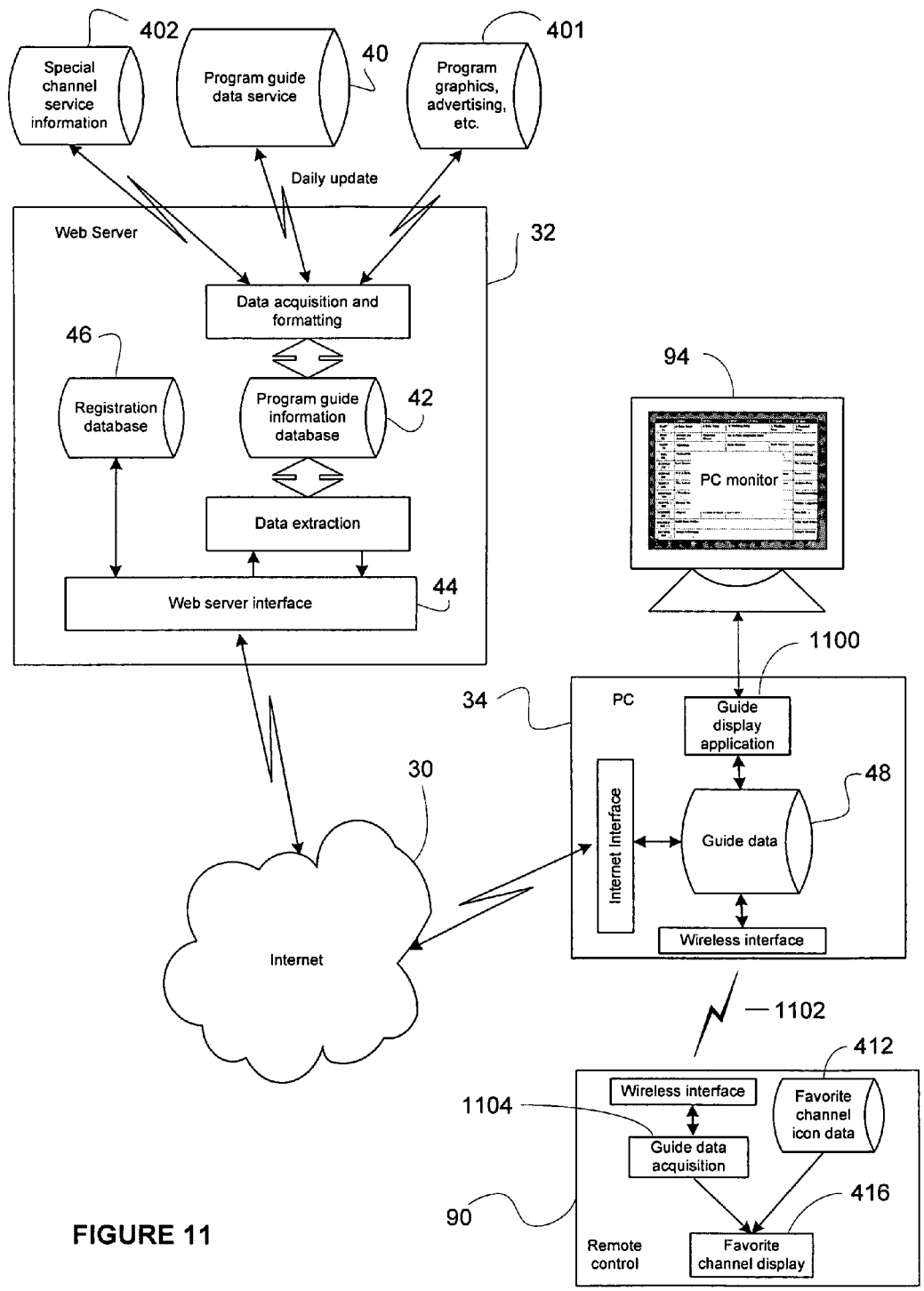
FIG. 11 illustrates an exemplary system and network by which program guide information may be obtained for use in the portable device of FIG. 9.
Figure 12:
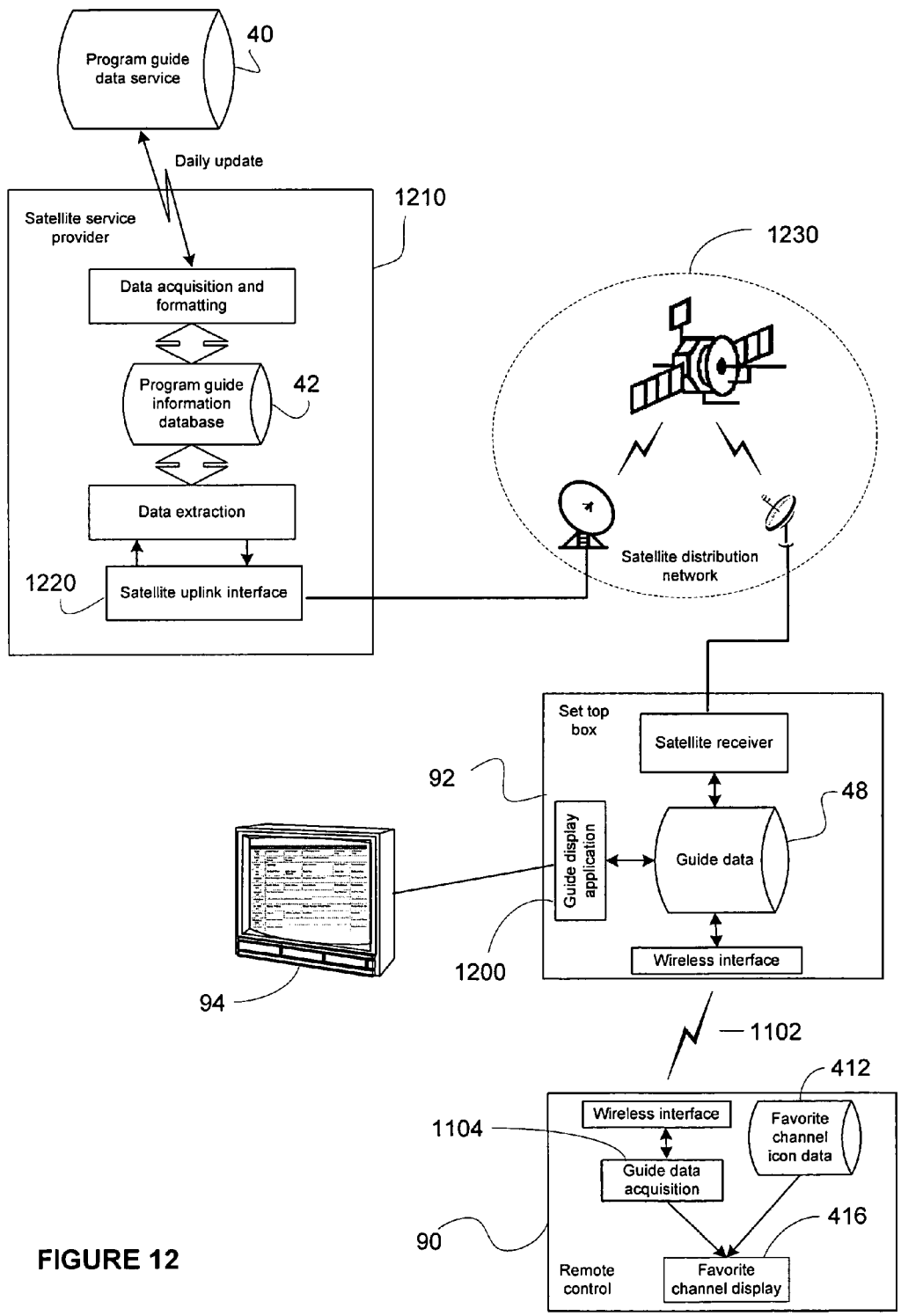
FIG. 12 illustrates a further exemplary system and network by which program guide information may be obtained for use in the portable device of FIG. 9

The interaction of the various components of these exemplary systems is illustrated in greater detail in FIGS. 11 and 12. Turning now to FIG. 11, user-configured program guide data 48 may be acquired by PC 34 via the Internet 30 (in a manner similar to that previously described in conjunction with FIG. 4). Such guide data may be used for general purpose guide display purposes by an application 1100 resident on PC 34; for scheduling of a PC-based DVR application (not shown); for updating viewing calendars, for making viewing recommendations, etc. PC 34 may also be capable of communicating with portable device 90 via a wireless link 1102 using either a standard networking protocol such as IEEE 802.11, Bluetooth, Zigbee, etc., or a proprietary point-to-point or other wireless communication protocol. Portable device 90 may utilize wireless link 1102 to download all or portions of the guide data 48 and store these locally in a similar manner to the portable device 10 of FIG. 4, or alternatively, as illustrated here may simply include an application 1104 which interacts directly with the PC-based guide data 48 to retrieve the necessary entries as and when favorite channel pages are generated by favorite channel display application 416.

FIG. 12 illustrates an exemplary system in which program guide data is distributed via satellite. A satellite service provider 1210 acquires and formats guide data 42 which is then accessed by a satellite uplink interface 1220 for distribution over a satellite network 1230. A satellite set top box 92 receives and decodes the satellite transmissions and stores the program guide data 48 locally within the box. This data may then be utilized by an interactive program guide application 1200 to allow a user to select channels for viewing, schedule recordings, etc., by interacting with a program grid displayed on a connected display device 94. Additionally, a portable device 90 capable of wireless communication 1102 with set top box 92 may use program guide data 48 to populate a favorite channel pages generated by a favorite channel display application 416.

It will be further appreciated that the controlling device may be a tuner, such as associated with a satellite radio system or other broadcasting system, where the supplemental data may be one or more of song titles, artist information, album information, genre information, program/movie titles, actor information, ratings information, closed captioning information, etc. that is extracted from the media transmission(s) and which may be displayed in association with the favorites buttons, e.g., preset tuning buttons, as described above. To this end, the supplemental data may be extracted from the media transmission(s) upon instantiation of the favorites page (or at designated times in the event the favorites page continues to be displayed) and/or may be periodically extracted from the media transmission(s) and stored in memory to thereby be made available for use in connection with the system described. Similarly, it will be appreciated that the supplemental data may be near realtime information that is extracted from one or more internet Web sites. For example, a Web site, which would likely be pre-designated by the supplier of the media content and/or provided at a time of configuration of the favorites page, may be accessed in connection with the display of the favorites page to retrieve supplemental data concerning a score of a sporting event, time remaining in a sporting event, etc. Still further, it will be appreciated that the favorites page may be configured such that the appearance of the favorites page is dynamically altered depending upon the supplemental data. For example, the favorites page may be configured such that the position of favorites buttons on a favorites page are dynamically changed according to time remaining in a broadcast program, according to score differential in a sporting event, according to programming genre or programming ratings, etc. and/or the appearance of favorites buttons and/or supplemental text fields (e.g., using foreground/background color schemes, flashing, etc.) may be dynamically changed based upon the genre of programming, ratings of programs, etc.

While various concepts have been described in detail, it will be appreciated by those skilled in the art that various modifications and alternatives to those concepts could be developed in light of the overall teachings of the disclosure. For example, although illustrative embodiments are presented in the context of favorite channel displays on a portable controlling device, it will be appreciated that the methods described herein may be applied in general to any application wherein there is a requirement to present a user with a series of selections for which it is advantageous to associate time-variable content descriptors with a group of fixed delivery conduits. For example, it may be desirable to configure a controlling device display such that Closed Caption (CC) data may be provided in one or more of the supplemental data panels displayed in association with channel buttons using the inventive concepts described herein. Further, while an exemplary embodiment described herein uses a setup wizard resident on the portable device itself to configure favorite channel displays, it will be appreciated that in alternative embodiments such configuration and setup may be performed using an external application and downloaded into the portable device, for example by a PC based editing program such as that described in co-pending U.S. patent application Ser. No. 11/218,900 "Configurable Controlling Device Having an Associated Editing Program", of like assignee.

While described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for configuring a controlling device to display information relevant to controlling one or more operations of one or more consumer electronic devices, comprising:
   causing a configuration process to configure a graphical user interface page of the controlling device whereupon the graphical user interface page of the controlling device is provided with a persistent, configurable button which is activatable to cause a transmission of one or more commands to control operations of the one or more consumer electronic devices to begin rendering of a media stream delivered from a media stream source that is caused to be associated with the configurable button through use of the configuration process;
   receiving into the controlling device first input for the purpose of displaying the configured graphical user interface page wherein, in connection with displaying the configured graphical user interface page, the controlling device retrieves from a source of supplemental data first supplement data wherein the first supplemental data is related to a first media stream which is being delivered from the media stream source at a time generally corresponding to a time that the first input was received for the purpose of displaying the configured graphical user interface page and displays the retrieved first supplemental data in a display field of the configured graphical user interface page which display field is positioned adjacent to the configured button; and
   receiving into the controlling device second input for the purpose of again displaying the configured graphical user interface page wherein, in connection with again displaying the configured graphical user interface page, the controlling device retrieves from the source of supplemental data second supplement data which relates to a second media stream being delivered from the media stream source at a time generally corresponding to a time that the second input was received for the purpose of again displaying the configured graphical user interface page and displays the retrieved second supplemental data in the display field of the configured graphical user interface page which display field is positioned adjacent to the configured button;
   wherein the first supplemental data which is displayed in association with the configured button when the configured graphical user interface page is displayed in response to the first input is different than the second supplemental data which is displayed in association with the configured button when the configured graphical user interface page is again displayed in response to the second input.

2. The method as recited in claim 1, wherein the graphical user interface page is configured on the controlling device.

3. The method as recited in claim 1, wherein the graphical user interface page is configured on a device external to the controlling device and is downloaded to the controlling device.

4. The method as recited in claim 1, wherein the retrieved first and second supplemental data comprises a synopsis of the respective first and second media streams being delivered from the media stream source wherein the synopsis of the respective first and second media streams are stored in the source of supplemental data in association with titles for the first and second media streams.

5. The method as recited in claim 1, comprising causing display of at least one of the retrieved first and second supplemental data to be toggled off while continuing with the display of the graphical user interface page configurable button.

6. The method as recited in claim 1, comprising storing the source of supplemental data in a memory accessible by the controlling device.

7. The method as recited in claim 6, comprising accessing a device external to the controlling device to access the memory storing the source of supplemental data.

8. The method as recited in claim 1, comprising assigning to the configurable button via the configuration process the one or more commands to control operations of the one or more consumer electronic devices.

9. The method as recited in claim 8, wherein the one or more commands are assigned to the configurable button via the configuration process on a device external to the controlling device and downloaded to the controlling device.

10. The method as recited in claim 1, comprising displaying the configured button in the displayed, configured graphical user interface page using an iconic logo associated with the media stream source.

11. The method as recited in claim 1, comprising causing at least one of the retrieved first and second supplemental data to be scrolled within the display field of the displayed, configured graphical user interface page.

12. The method as recited in claim 1, comprising causing at least one of the retrieved first and second supplemental data to be rolled within the display field of the displayed, configured graphical user interface page.

13. The method as recited in claim 1, comprising causing at least one of the retrieved first and second supplemental data displayed in the display field of the displayed, configured graphical user interface page to be updated with new supplemental data retrieved from the source of supplemental data when the configured graphical user interface page is displayed for longer than a predetermined period of time.

14. The method as recited in claim 1, comprising retrieving the first and second supplemental data from an electronic program guide.

15. The method as recited in claim 1, comprising retrieving the first and second supplemental data from a media transmission from the media stream source.

16. The method as recited in claim 1, comprising retrieving the first and second supplemental data from a Web site.

17. The method as recited in claim 1, wherein the configured button comprises a soft button displayed within the displayed, configured graphical user interface page and the method comprises using at least one of the retrieved first and second supplemental data to cause a change in a location in which the configured button is displayed within the displayed, configured graphical user interface page.

18. The method as recited in claim 1, comprising using at least one of the retrieved first and second supplemental data to cause a change in a visual appearance associated with the configurable button as displayed in the displayed, configured graphical user interface page.

19. The method as recited in claim 1, comprising using at least one of the retrieved first and second supplemental data to cause a change in a visual appearance associated with the display field as displayed in the displayed, configured graphical user interface page.

\* \* \* \* \*